United States Patent [19]
Field et al.

[11] 3,852,222

[45] Dec. 3, 1974

[54] FLUORINATED EPOXY RESINS

[75] Inventors: Donald E. Field, Falls Church, Va.; James R. Griffith, Riverdale Heights, Md.

[73] Assignee: The United States of America as represented by the Secretary of the Navy, Washington, D.C.

[22] Filed: June 25, 1973

[21] Appl. No.: 373,322

[52] U.S. Cl. .......... 260/2 EP, 260/2 N, 260/47 EN, 260/77.5 AP, 260/611 A, 260/618 D
[51] Int. Cl. ..................... C08g 22/14, C08g 30/02
[58] Field of Search ...... 260/47 EN, 2 BP, 77.5 AP, 260/2 EP, 618 D, 611 A

[56] References Cited
UNITED STATES PATENTS

| | | | |
|---|---|---|---|
| 3,475,384 | 10/1969 | Tuschler | 260/77.5 AP |
| 3,489,813 | 1/1970 | Dewhirst | 260/2 EP |
| 3,591,547 | 7/1971 | Boudakien | 260/77.5 AP |
| 3,706,772 | 12/1972 | Reines | 260/618 D |
| 3,707,483 | 12/1972 | Reines | 260/2 EP |

*Primary Examiner*—Morris Liebman
*Assistant Examiner*—S. L. Fox
*Attorney, Agent, or Firm*—R. S. Sciascia; Arthur L. Branning

[57] ABSTRACT

Highly fluorinated polymers are synthesized and crosslinked to form fluorinated network polymers.

10 Claims, No Drawings

FLUORINATED EPOXY RESINS

BACKGROUND OF THE INVENTION

The invention relates to epoxy resins and urethanes useful as coatings, adhesives and laminates. These resins have applications as aircraft windshield coatings, ship coatings, spacecraft coatings, dental prosthetics, optical cements, laser window adhesives and so on. The polymers are highly hydrophobic and can be used as coatings for automobiles which will greatly reduce the need for waxing.

SUMMARY OF THE INVENTION

Fluorinated polymers are produced by reacting one or more fluorinated diols with epichlorohydrin and NaOH. By this process copolymers of the epoxy-terminated polyol type are obtained.

THE INVENTION

It has been discovered a new class of prepolymers useful in and of themselves as coatings and laminates, or as precursors which can be crosslinked to provide further copolymers. The prepolymer may be of low molecular weight wherein its terminal epoxy groups are significant or it may be of a higher molecular weight having such a great number of hydroxyl groups that the terminal epoxies are of little significance.

The former is a polymer comprising the formula:

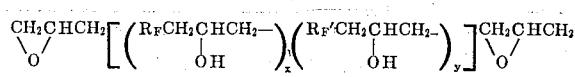

where $i$ is an integer less than 10.

The latter comprises units represented by the following formula recurring more than ten times.

(2) 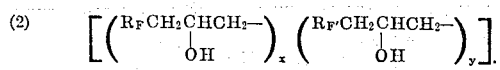

$R_F$ may be either

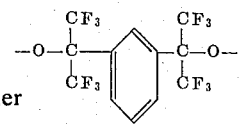

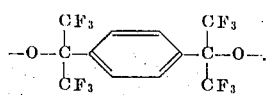

or

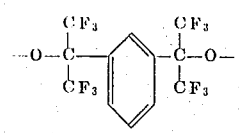

$R_F'$ is an aliphatic fluorocarbon, $-OCH_2(CF_2)_zCH_2O-$, $z$ being an integer from 2 to 12. Both $R_F$ and $R_F'$ may occur in the unit as many as four consecutive times in their respective positions or $R_F'$ may be absent from the unit entirely. Hence $x$ is an integer from about 1 to 4 and $y$ is an integer from about 0 to 4. Since the polymer produced is a copolymer and not a homopolymer, $y$ will not always equal 0. The prepolymers are random copolymers so that in each successive unit $x$ and $y$ may be a different number from the $x$ and $y$ in the previous unit. It must also be pointed out that $x$ will seldom equal $y$.

The polyol prepolymer (2) is prepared by reacting two fluorinated diols with epichlorohydrin. Generally, the following reaction scheme is used to produce the prepolymer polyol:

(A) 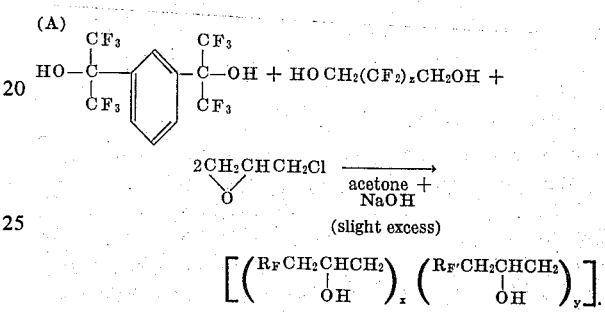

In order to more fully illustrate the method by which the polyol prepolymer (2) is produced the following examples are provided:

EXAMPLE I

A 4-liter reaction flask equipped with a heating mantle, magnetic stirrer, thermometer, reflux condenser and dropping funnel was charged with 923 grams (2.25 moles) of 1,3(2-Hydroxyhexafluoro-2-propyl)benzene hereinafter referred to as m-diol, 477 grams (2.25 moles) of 2,2,3,3,4,4-Hexafluoro-1,5-pentanediol hereinafter referred to as HFPD, 417 grams (4.5 moles) of epichlorohydrin and 1.5 liters of acetone. The mixture was heated and stirred to a clear solution. A solution of 189 grams (4.725 moles) of NaOH and 0.3 liters of water were added to the mixture slowly while stirring. This reaction mixture was heated to reflux and stirred for 92 hours at which time a sample which was run through a gas chromatograph showed the absence of peaks for the starting materials. Approximately one half of the acetone was distilled from the reaction and the residue poured into 8 liters of distilled water then heated to drive off the remaining acetone. Distilled water was added to cool the solid polymer residue and decanted off. The residue was washed with additional distilled water by heating, cooling and decanting until the washings were neutral to test paper and free of chloride. The polymer was then dried in a 120°C oven for 24 hours. The resulting polymer (2) had a hydroxyl equivalent weight of 376.

EXAMPLE II

A 100 ml reaction flask was charged with 20.5 grams (0.05 moles) of the m-diol, 4.7 grams (0.05 moles) of epichlorohydrin and 50 ml of acetone. The reaction was allowed to proceed as in Example I. A solution of 2.2 grams (0.055 moles) NaOH and 5 ml of water was added slowly to the mixture while stirring. The reaction mixture was heated, reflux and stirred for 92 hours.

The resulting polymer (2) was washed 3 times in 500 ml distilled water as in Example I. The yield, 22 grams, was 94 percent of the theoretical yield.

EXAMPLE III

A 200 ml reaction flask was charged with 20.5 grams (0.05 moles) of the m-diol, 5.3 grams (0.025 moles) of HFPD, 6.9 grams (0.075 moles) of epichlorohydrin and 30 ml of acetone. The mixture was heated and stirred as in Example I. A solution of 3.3 grams (0.083 moles) of NaOH and 5 ml of H$_2$O was added while stirring. The reaction mixture was then heated to reflux and stirred for 140 hours. After washing a polymeric yield of 28.1 grams, 94 percent of the theoretical yield, was obtained.

The polyol prepolymer (2) may be crosslinked with a crosslinking agent which converts the polyol into a polyurethane having the following formula:

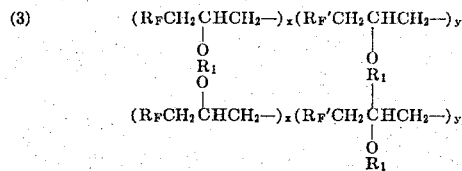

where $R_F$, $R_F'$, $x$ and $y$ have the same meaning as was used in the formula for the polyol (2). $R_1$ is a urethane derived from an isocyanate having at least two functional groups. Typical crosslinking agents forming the $R_1$ group are hexamethylene diisocyanate and derivatives thereof such as the the biuret 3 moles of hexamethylane diisocyanate and 1 mole of water. Toluene 2,4 and 2,6 diisocyanate and derivatives thereof such as the adduct with trimethylalpropane can be used as well. Any known isocyanate that is at least difunctional can be used. Catalysts can be used to promote the crosslinking. Typical catalysts are dibutyl tin dilaurate and lead naphthinate.

In order to more fully illustrate the crosslinking of the polyol prepolymer (2) the following example is provided:

EXAMPLE IV

A 50 percent by weight of the polyol prepolymer produced by Example I was added to a 20,20,60 volume percent mixture of methylisobutylketone,ethylacetate,ethyleneglycol monoethylether acetate. This mixture had a viscosity of 14 centipoise. The mixture was then mixed with a stoichiometric amount of hexamethylene diisocyanate and 0.003 grams of dibutyl tin dilaurate per 1 gram of polyol. When a film of this solution mixture was applied to a metal substrate it was tack free in one hour and fully cured in 24 hours. This film had a critical surface tension of wetting of 17.9 dynes/cm after a 40-day exposure to a 100 watt mercury lamp. It's specific permeability was 0.78 mg/cm$^2$/mm/24 hours.

The epoxy terminated prepolymer (1) is synthesized in a somewhat different manner than the polyol prepolymer (2). These prepolymers are synthesized via reaction (A) except that an excess epichlorohydrin is used to form terminal epoxy groups on the polymeric chain. These polymers are usually viscous liquids at room temperature since the chain length will be shorter than when a stoichiometric amount of epichlorohydrin is used. Either m-diol may be used by itself or a combination of the m-diol and the HFPD. To better illustrate the synthesis of the prepolymer (1) the following example is provided:

Example V

In this example the diols are first reacted with sodium hydroxide before the epichlorohydrin is added. In a 1 liter flask equipped with a reflux condenser, dropping funnel thermometer, heating mantle and magnetic stirrer were added 205 grams (0.5 moles) of the m-diol, 53 grams (0.25 moles) HFPD, 400 ml acetone and 100 ml water. This solution was heated to reflux and 60 grams of NaOH (1.5 moles) were added slowly to prevent column flooding. This reaction is exothermic at reflux temperature. To this solution were added 243 grams (2.63 moles) of epichlorohydrin slowly, through the dropping funnel. After a 24 hour reflux the solution was poured into 5 liters of distilled water. This was heated until most of the acetone was evaporated or to about half the volume. The water wash was cooled and decanted off. Water addition, heating, cooling, and decanting were repeated three more times. The polymer was dried in a 120°C oven for 24 hours. Yield of the dry epoxy terminated polymer (1) was 286 grams or 91 percent of the theoretical.

This polymer can be crosslinked at room temperature by adding from about 5 to 10 percent by weight polyamine such as diethylene triamine. The crosslinked polymer produced consists of units of the following:

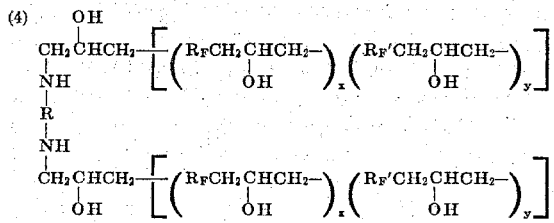

wherein $R_F$ and $R_F'$, $x$ and $y$ have the same meaning as above. R is a polyamine such as diethylene triamine.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A random epoxy-terminated copolymer comprising recurring units of the formula:

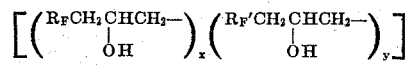

wherein $R_F$ is selected from the group consisting of

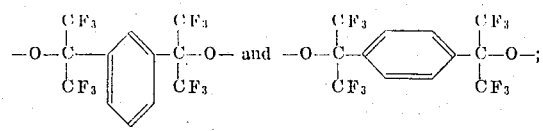

$R_{F'}$ is $-OCH_2(CF_2)_zCH_2O-$ z being an integer from about 2 to 12; $x$ is an integer from 1 to about 4, and $y$ is an integer from 0 to about 4, with proviso that $y$ is not always equal to 0.

2. A crosslinked random epoxy-terminated copolymer comprising recurring units of the formula:

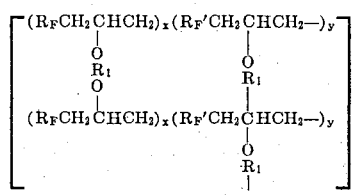

wherein $R_F$ is selected from the group consisting of

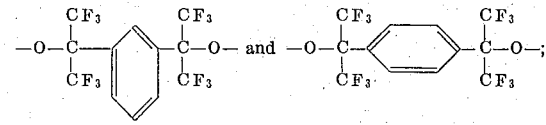

$R_{F'}$ is $-OCH_2(CF_2)_zCH_2O-$, $z$ being an integer from 2 to 12; $R_1$ is a urethane containing at least 2 functional units; $x$ is an integer from 1 to about 12, $y$ is an integer from 0 to about 4, with the proviso that $y$ is not always equal to 0.

3. A copolymer according to claim 2, wherein $R_1$ is a urethane derived from an isocyanate selected from the group consisting of hexamethylene diisocyanate, toluene diisocyanate, and derivatives thereof.

4. A random copolymer comprising the formula:

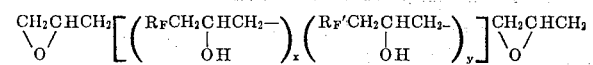

wherein $i$ is less than 10;
$R_F$ is selected from the group consisting of

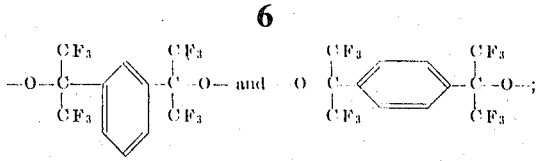

and
$R_{F'}$ is $-OCH_2(CF_2)_zCH_2O-$, $z$ being an integer from 2 to 12; $x$ is an integer from 1 to about 4; and $y$ is an integer from 0 to about 4, with the proviso that $x$ does not always equal $y$.

5. A crosslinked copolymer comprising recurring units of the formula:

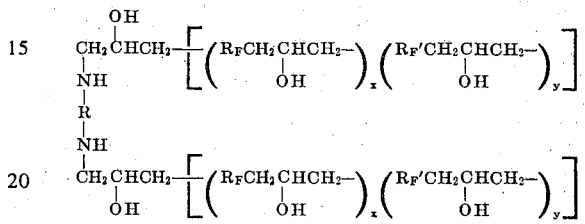

wherein $R_F$ is selected from the group consisting of

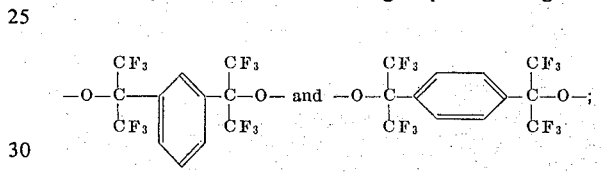

$R_{F'}$ is $-OCH_2(CF_2)_zCH_2O-$, $z$ being an integer from 2 to 4 and R is a polyamine, $x$ is an integer from 1 to about 4, and $y$ is an integer from 0 to about 4.

6. The polymer of claim 5 wherein R is diethylene triamine.

7. A reaction process for the production of a highly fluorinated copolymer comprising:
reacting fluorinated diols selected from the group consisting of 1,3-Bis(2-Hydroxyhexafluoro-2-propyl)benzene, 2,2,3,3,4,4-Hexafluoro-1,5-Pentanediol, 1,4-Bis(2-Hydroxyhexafluoro-2-propyl)benzene, and mixtures thereof with epichlorohydrin and NaOH in the presence of acetone, and heating the reactants to reflux.

8. A reaction process according to claim 7 wherein the molar amount of epichlorohydrin is equivalent to the molar amount of fluorinated diol and the NaOH is present in excess of said molar amount.

9. A reaction process according to claim 7 wherein the molar amount of epichlorohydrin is in excess of the molar amount of fluorinated diol.

10. The copolymer according to claim 4, wherein $i$ is greater than 10.

* * * * *